Dec. 3, 1968  W. G. FASTIE ET AL  3,414,355
SPECTROMETER WITH A GRATING MOUNTED FOR
MOTION ABOUT TWO AXES
Filed June 10, 1964  9 Sheets-Sheet 1
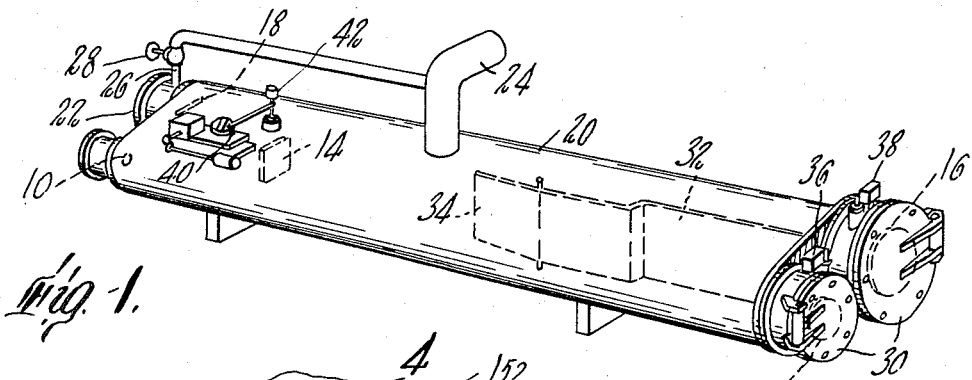
Fig. 1.
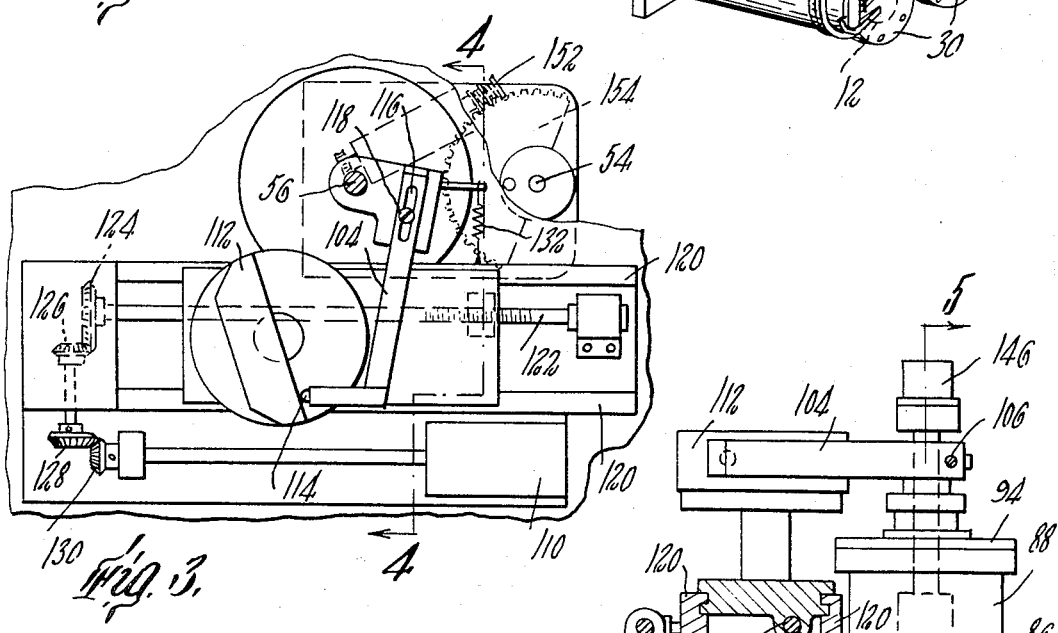
Fig. 3.
Fig. 4.
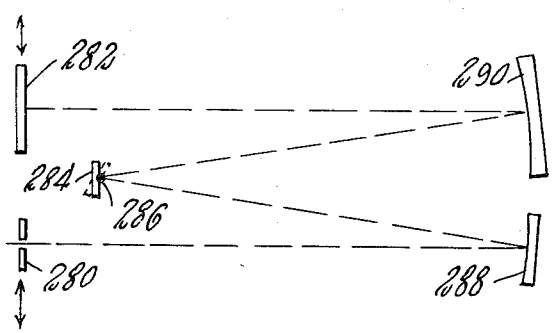
Fig. 12.
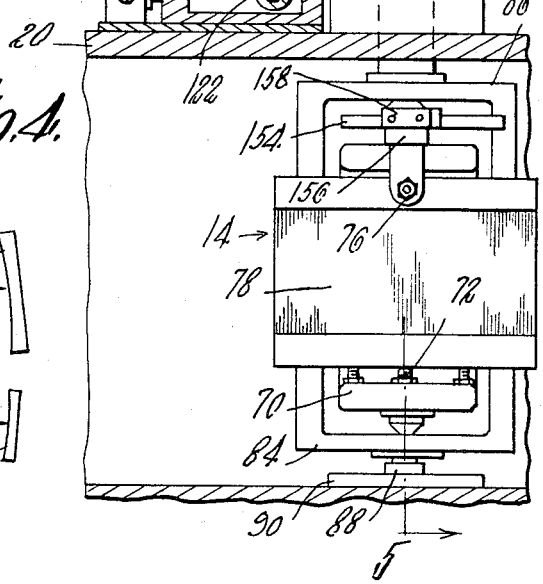

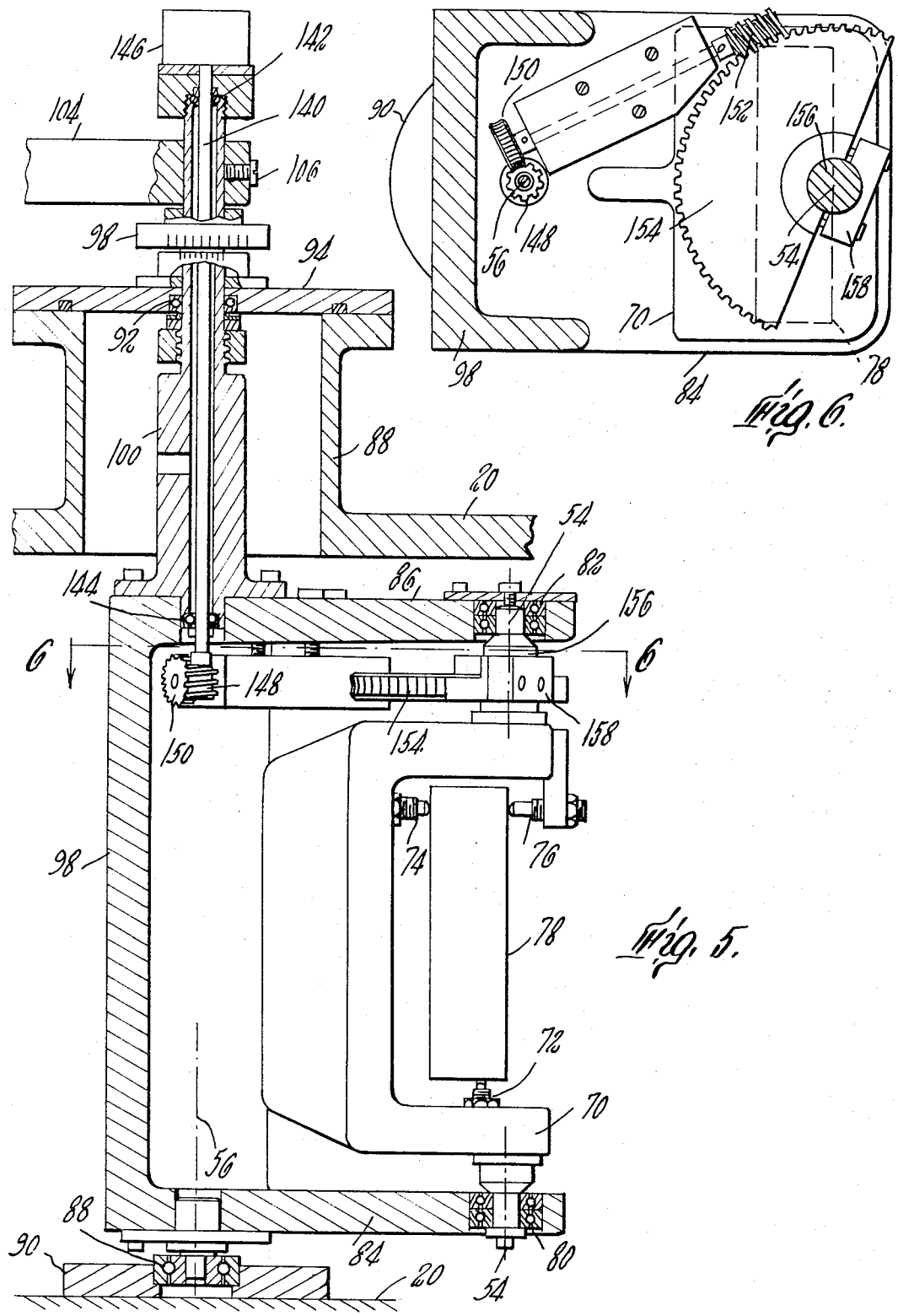

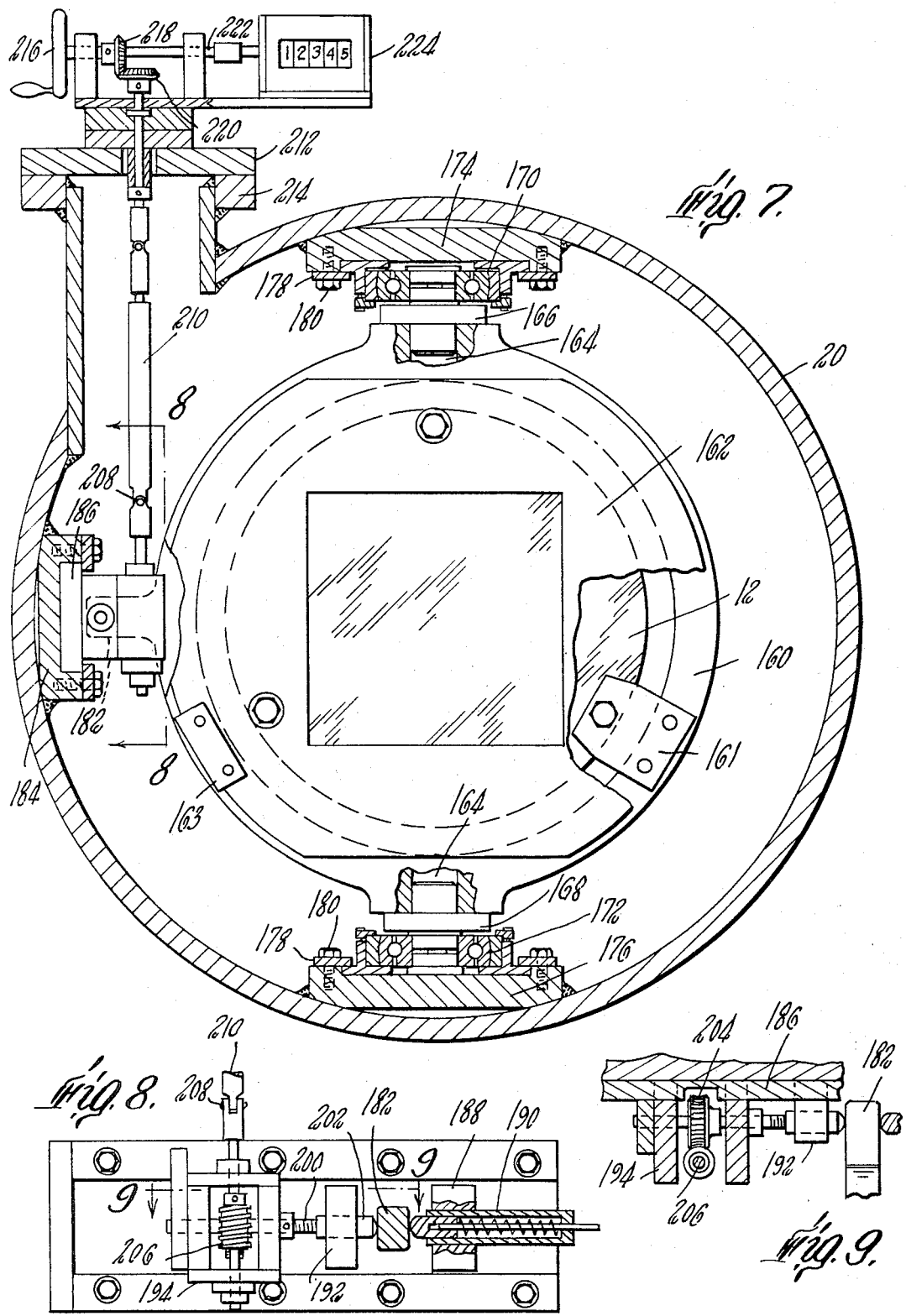

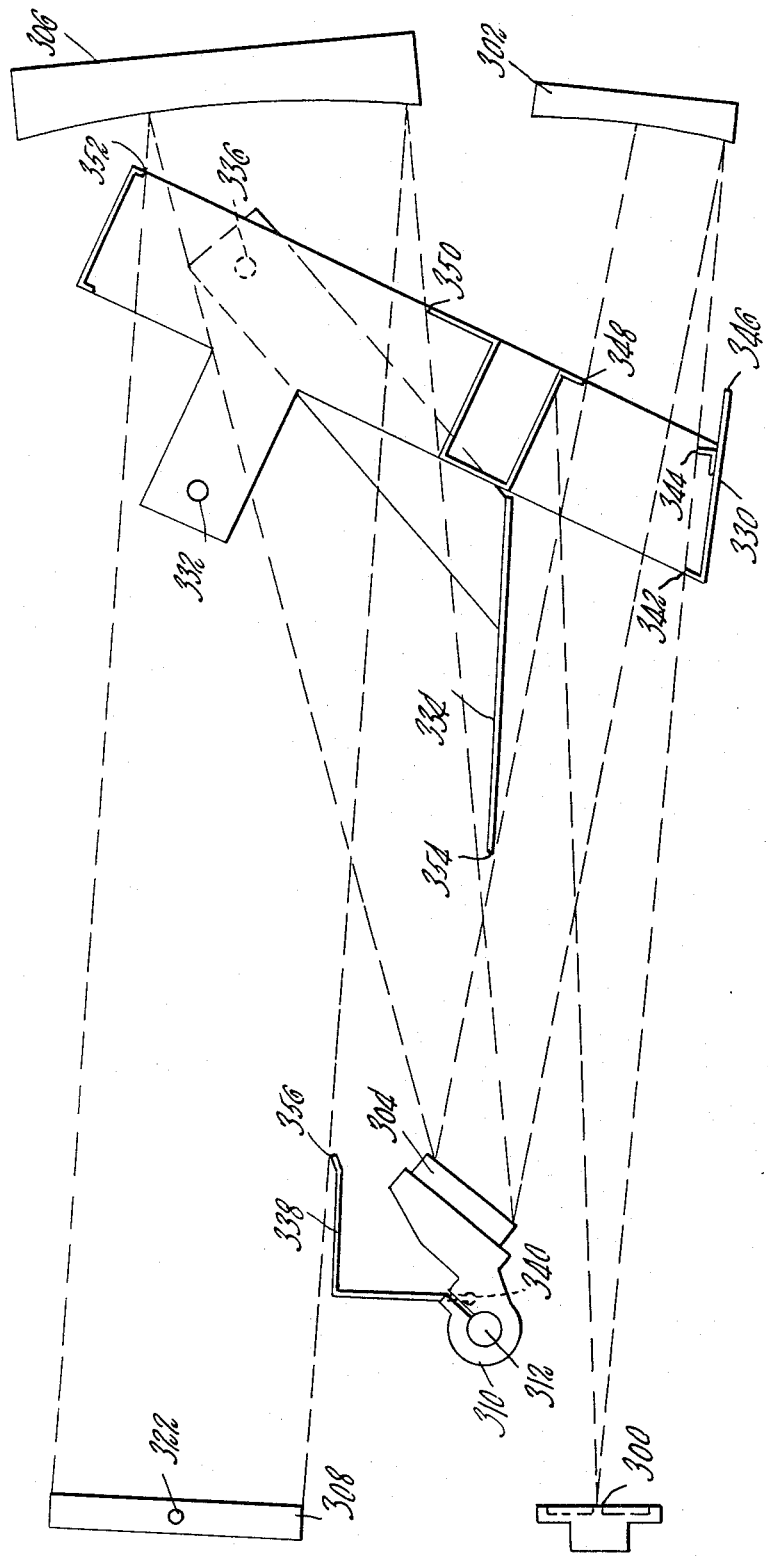

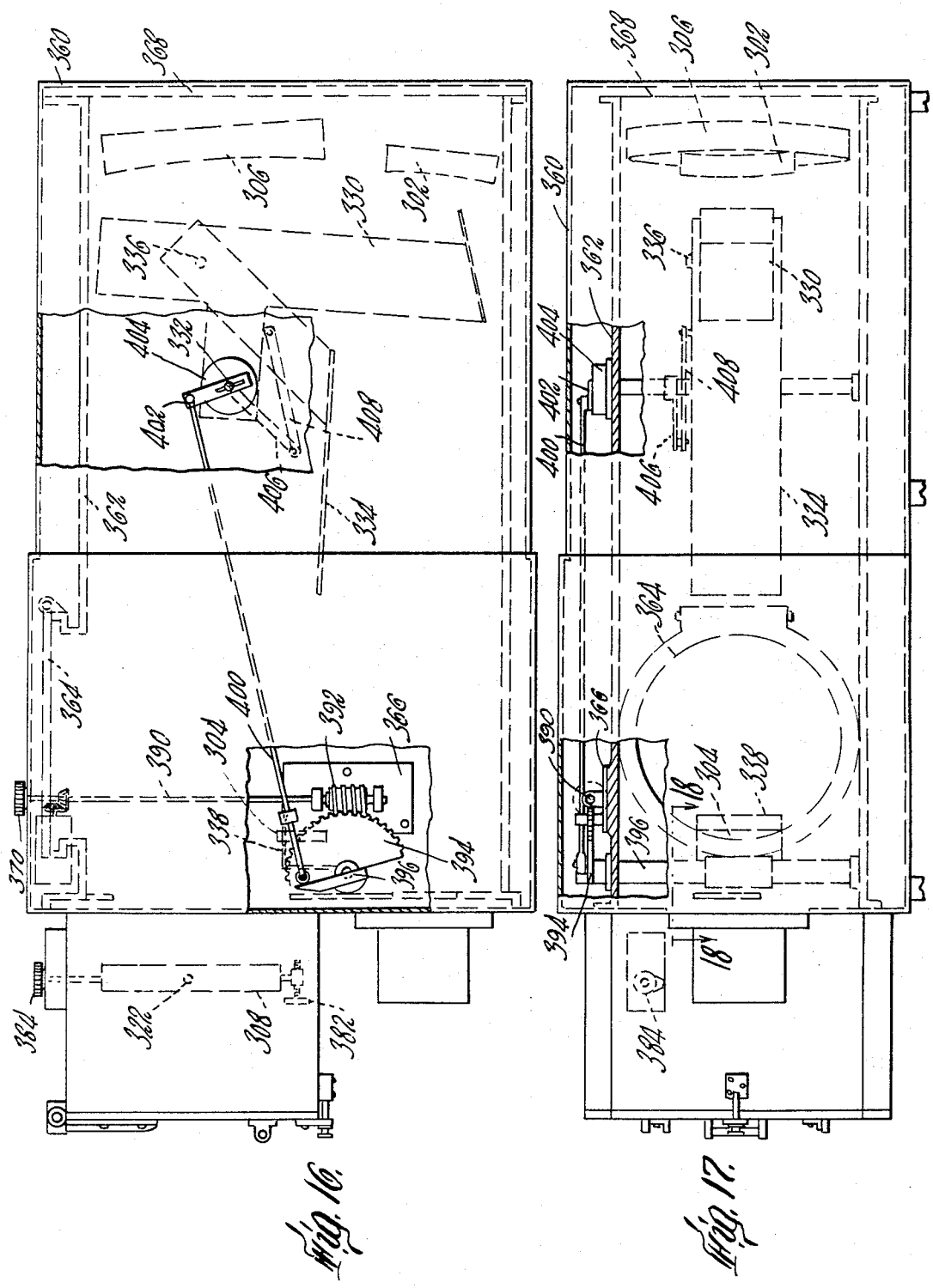

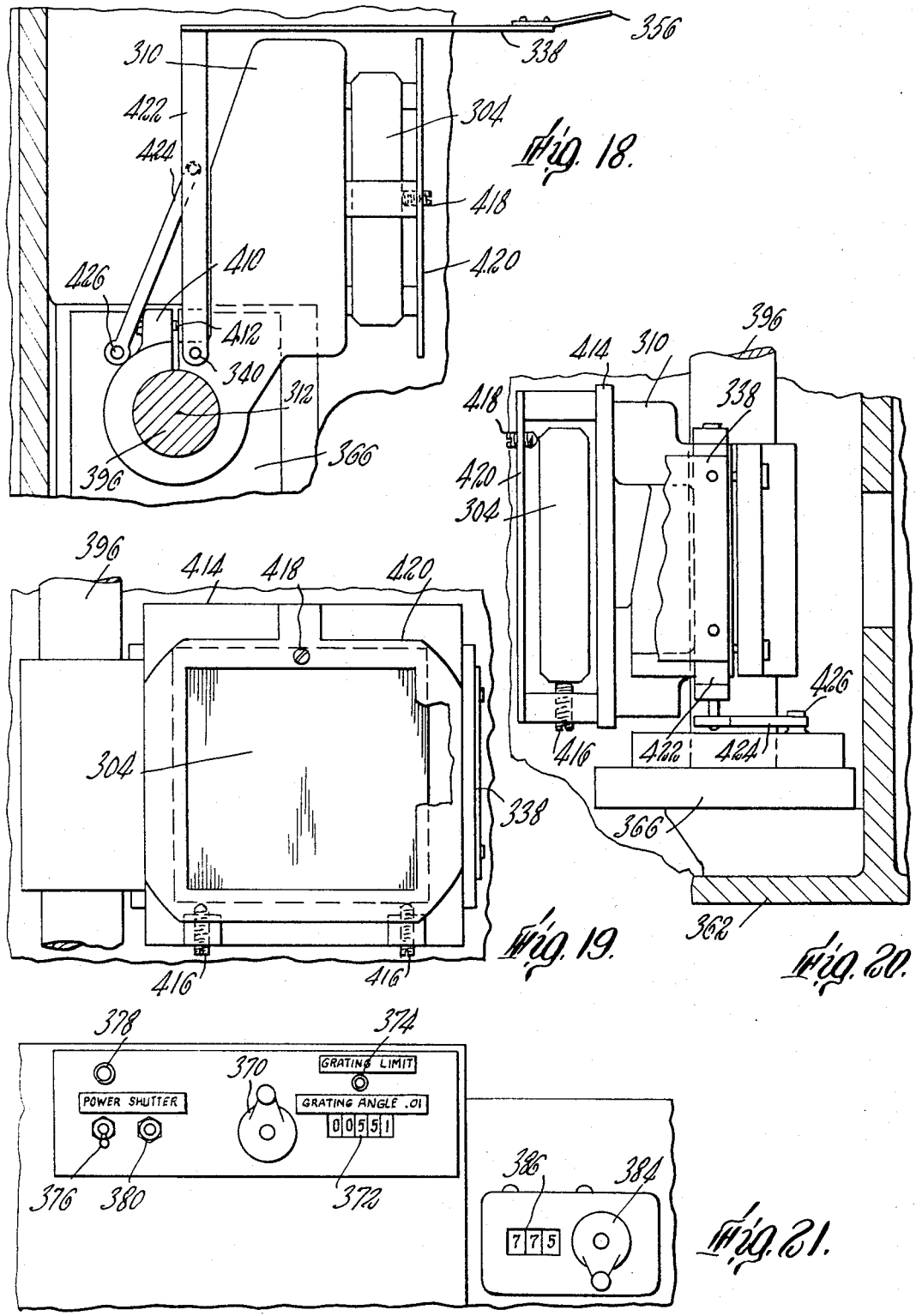

United States Patent Office

3,414,355
Patented Dec. 3, 1968

3,414,355
SPECTROMETER WITH A GRATING MOUNTED
FOR MOTION ABOUT TWO AXES
William G. Fastie, Owings Mills, Md., and Richard K.
Brehm, Lexington, Mass., assignors, by mesne assignments, to Fisher Scientific Company, Pittsburgh, Pa.,
a corporation of Pennsylvania
Filed June 10, 1964, Ser. No. 373,908
16 Claims. (Cl. 356—100)

ABSTRACT OF THE DISCLOSURE

A plane grating vacuum spectrometer includes $f/40$ entrance slit optics, a ten inch spherical collimating mirror, a five by ten inch plane grating, a twenty-four inch spherical camera mirror of 500 cm. focal length and exit slit optics which receives a twenty inch plate holder. The plane grating is mounted for rotation about the axes—a first axis in the face of the grating and a second axis offset 18.42 cm. from the first axis. Both mirrors are also mounted for rotation about axes parallel to the rulings of the grating and rotation of the mirrors and grating is coordinated to maintain minimum coma centered at the exit slit.

---

This invention relates to optical systems and more particularly to high-resolution spectroanalytical systems that employ dispersing elements of the plane grating type. As used herein, the term "spectroanalytical" is intended to include both spectrographs and spectrometers and related instruments.

In a spectroanalytical instrument employing a dispersing element of the plane grating type, coma aberration is produced when spherical reflecting surfaces are used at off-axis angles. Typically, the beam of radiation entering through the entrance aperture impinges on a spherical "collimating" mirror which renders the rays of the reflected beam substantially parallel and directs them onto the grating for diffraction by the grating into a beam that impinges on the "camera" mirror. The "camera" mirror reflects the diffracted radiant energy through the exit aperture for recording by photographic or photoelectric apparatus. In this type of spectroanalytical instrument coma is introduced by the first spherical mirror. This introduction of coma can be avoided by the use of suitable corrective systems such as those of Schmidt or Meinel, but such systems employ aspherical surfaces, and hence are expensive to manufacture as they involve hand figuring. Also, the focal planes to be used with such systems may be relatively inaccessible and the systems are very difficult to optically adjust and keep in adjustment. Through specific geometrical configurations, the coma introduced by the collimating mirror due to its off-axis orientation can be significantly compensated for by the camera mirror. Czerny and Turner, in Zeits fur Physik, vol. 61, pp. 792 through 797, March 1930, entitled, "Uber den Astignatixmus bei Spiegelspektrometern," described a coma correcting arrangement for a monochromoter in which the spherical mirrors are arranged at equal but opposite off-axis angles. In a spectrograph, however, a larger mirror is employed, and hence the off-axis angles are larger. Fastie, in Patent No. 3,011,391, described an asymmetrical optical arrangement for a spectrograph which provides improved coma compensation. However, as the optical components were fixed (except for grating rotation), adequate coma compensation was obtained only over a limited range of grating angles for any given geometry.

Accordingly, it is an object of this invention to provide a novel and improved spectroanalytical instrument in which coma is minimized over the entire range of angular orientation of the grating in the instrument.

Another object of this invention is to provide a novel and improved spectroanalytical instrument having better coma reduction characteristics than comparable instruments heretofore available.

Still another object of the invention is to provide novel and improved spectroanalytical instrument arrangements employing plane gratings enabling coma aberration to be maintained substantially constant over a range of wave lengths as a function of the angular orientation of the grating.

Another object of the invention is to provide novel and improved mountings for optical components for use in spectroanalytical instruments of the plane grating type.

Another object of the invention is to provide a spectroanalytical instrument of the plane grating type employing interrelated controls for movement of the grating and a baffle system.

Still another object of the invention is to provide novel and improved grating mounts for spectroanalytical instruments of the two-mirror, plane grating type.

A further object of the invention is to provide novel and improved mountings for reflecting mirrors employed in a spectroanalytical instrument of the two-mirror, plane grating type.

In accordance with the invention a plane grating instrument is constructed having a selected condition of coma established at the exit aperture. This condition is preferably the minimum coma condition as determined following the teachings of Czerny and Turner, for example, or the above-mentioned Fastie patent. The instrument further includes means to move one or more of the optical components of the instrument, including the entrance and exit apertures, the spherical reflecting means, and the plane grating, relative to one another with at least the plane grating being translated in a direction generally perpendicular to the optical axis and in the plane of the instrument. The movements are coordinated with the rotation of the plane grating as it scans over the wavelengths of interest so that the coordinated movements maintain the coma condition in substantially the same position at the exit aperture over a substantial range of angular rotation of the plane grating.

While any one or more of the optical components can be translated to achieve this coma reduction, it is preferred, from a mechanical standpoint, to provide the translation through rotary motion of a radius arm, which translation may require compensation by a second rotary motion. Rotary motion is particularly convenient in vacuum instruments as the problems of sealing the enclosures are simplified where rotary seals are used. Also in large instruments it becomes very difficult to accurately mount the large optical components for precise translation as is necessary where the desired magnitudes of resolution are to be achieved.

In preferred embodiments the plane grating of the spectroanalytical instrument is mounted for rotation about an axis not in the face of the grating as in conventional instruments, but about an axis offset a substantial distance from the face of the grating. The location of this axis with respect to the face of the grating is selected so that the rotation of the grating holder about this axis will simultaneously effect the translation of the grating and a rotation thereof. In order to compensate for this grating translation, one or more of the other optical components in the instrument may be mounted for rotation and their angular orientation adjusted as a function of the angular orientation of the plane grating. The resulting instruments constructed in accordance with the invention enable attainment of higher resolving powers ($\lambda/\Delta\lambda$), larger aperture ratios than conventionally available, and/or operation over a range of angles of grating incidence from 0° to 65° and above. Other objects, features and advantages of the invention will be seen as the following description of preferred embodiments thereof progresses, in conjunction with the drawings, in which:

FIG. 1 is a perspective view of a spectroanalytical instrument having a carema mirror of five meters focal length constructed in accordance with the invention;

FIG. 3 is a top plan view of the grating mounting employed in the instrument shown in FIG. 1 and controls for moving that grating;

FIG. 4 is a sectional view of the grating mounting taken along the line 4—4 of FIG. 3;

FIG. 5 is a sectional view of the grating mounting taken along the line 5—5 of FIG. 4;

FIG. 6 is a sectional view of the grating mounting taken along the line 6—6 of FIG. 5;

FIG. 7 is a sectional view through the vacuum chamber of the instrument shown in FIG. 1 showing details of the mounting of the collimating mirror;

FIG. 8 is a sectional view taken along the line 8—8 of FIG. 7 showing details of the rotation control mechanism for the collimating mirror;

FIG. 9 is a sectional view taken along the line 9—9 of FIG. 8 showing further details of the mirror angle adjustment mechanism;

FIG. 12 is an optical diagram of a second embodiment of a spectroanalytical instrument constructed in accordance with the invention;

FIGS. 14 and 15 are diagrammatic views of positions of the movable baffles employed in the instrument shown in FIG. 13 with the optical components in a 0° position and a 40° position, respectively;

FIG. 16 is a top plan view, with parts broken away, of the spectroanalytical instrument indicated in the diagram of FIG. 13;

FIG. 17 is a side elevational view, with parts broken away, of the instrument shown in FIG. 16;

FIG. 18 is a sectional view taken along the line 18—18 of FIG. 17 of the grating mounting employed in the instrument shown in FIGS. 16 and 17;

FIG. 19 is a front elevational view of the grating and mounting;

FIG. 20 is a side view of the grating mounting shown in FIGS. 18 and 19 with portions of the baffle unit broken away; and FIG. 21 is a front view of grating and camera plate holder controls employed in the instrument shown in FIGS. 16 and 17.

Figure 2:
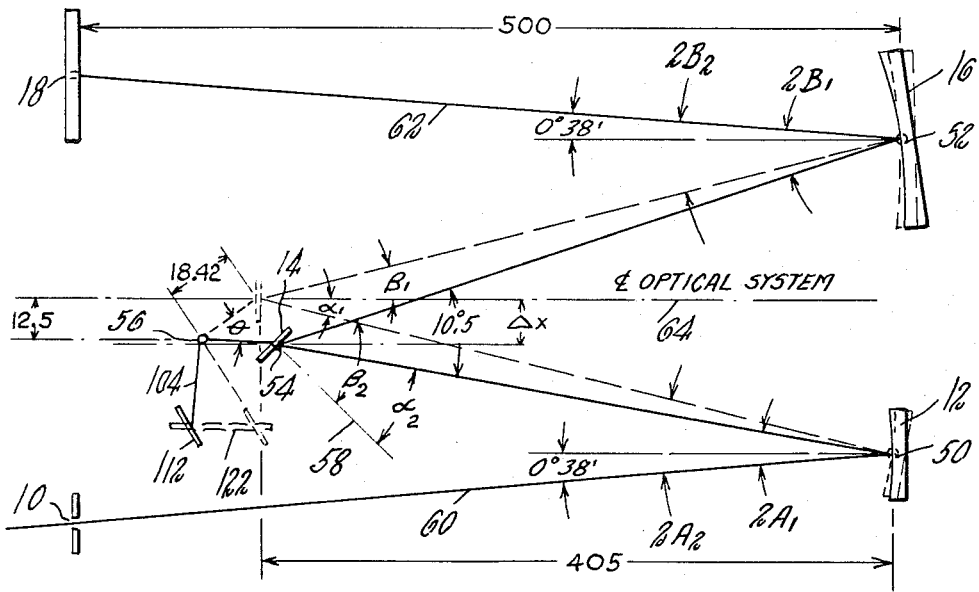
FIG. 2 is a diagrammatic view of the optical arrangement of the components in the instrument shown in FIG. 1.

With reference to FIG. 1 there is shown a plane grating vacuum spectrograph capable of photographic and photoelectric measurements. The instrument permits attainment of resolving powers in the order of one million and accepts a wide variety of interchangeable gratings for spectral regions down to less than 1200 A. and angles of grating incidence to 65° and above. The instrument has conventional entrance slit optics defining an $f/40$ aperture generally indicated by the reference numeral 10, a ten inch spherical collimating mirror 12, a five by ten inch plane grating 14, a twenty-four inch spherical camera mirror 16 and an exit aperture structure generally indicated by the reference numeral 18 which receives a twenty-inch plate holder. These optical components of the spectrograph are housed in a main vacuum chamber 20 with an auxiliary vacuum chamber 22 being provided in which a conventional plate holder 23 is mounted adjacent the exit aperture 18. Main vacuum connection 24 and auxiliary connection 26 through valve 28 enable the spectrograph chambers 20, 22 to be evacuated to pressures in the order of $5 \times 10^{-6}$ mm. Hg.

Individual doors 30 to the mirror mountings, the entrance and exit slits, and the grating mounting are provided. A baffle structure 32, with movable portions 34, is positioned between the two mirrors 12 and 16. The entrance aperture optics 10 may include adjustable slit arrangements, source holders, shutter arrangements of conventional nature, and the exit aperture structure may mount a plate holder in conventional manner. Positioning controls 36, 38 are provided for mirrors 12, 16, respectively, and dual controls 40 (sine bar) and 42 are provided for grating 14.

A diagrammatic view of the instrument is shown in FIG. 2. As there indicated, the focal length of camera mirror 16 is 500 centimeters. Mirrors 12, 16 are mounted for rotation about axes 50, 52, respectively, parallel to the grating rulings and the grating 14 is mounted for rotation about two axes—an axis 54 in the face of the grating and axis 56 parallel to axis 54 but offset a substantial distance (a radius of 18.42 centimeters in this embodiment).

The instrument includes these adjustability features in order that the position of minimum coma may be maintained at the center of the exit aperture. As set forth in Fastie Patent 3,011,391 entitled "High Speed Plane Grating Spectrograph and Monochromator," issued December 5, 1961, the position of minimum coma is a function of the off-axis angles (A, B) at which the mirrors 12, 16, respectively, are set and the angles of incidence ($\alpha$) and refraction ($\beta$) of radiant energy at the grating 14 with respect to the normal 58 to the plane of the grating. The relation of $\alpha$ and $\beta$ to wavelength ($\lambda$) is set forth in the well-known equation $n\lambda = a(\sin \alpha + \sin \beta)$. Where the focal lengths of the mirrors 12, 16 are equal, the relationship is $A/B = \cos^3 \beta / \cos^3 \alpha$.

Indicated in FIG. 2 is a first position of the optical components (dotted line) and a second position (solid line) offset $\theta°$ from the first position. In the first position the components are symmetrically located with respect to the optical axis—the center ray 60 of energy incident on mirror 12 and the center ray 62 reflected from mirror 16, each being inclined at 0°38' to the optical axis 64; and angles $\alpha_1$ and $\beta_1$, each being equal to 5°.25. In the second position the angles of rays 60 and 62 remain the same, but the sign of $\alpha$ has changed and $\beta$ is larger as the orientation ($\theta$) of the grating face has been changed.

During this change of grating orientation, the grating 14 has been translated the distance $\Delta x$ as a result of rotation about axis 56, compensation ($\Delta \alpha$) in the angular orientation of grating 14 has been introduced through rotation about axis 54, and both mirrors 12, 16 have been rotated about their respective axes 50, 52. Through coordination of the adjustments of these components, the grating 14 remains fully illuminated and the point of minimum coma remains centered at the exit aperture 18. These motions may be interrelated through mechanical or servo links or may be independently controlled as desired. The following table indicates the nature of the motions for the components where $\theta$, A, $\alpha$, and $\Delta\alpha$ are in degrees ($\beta=10°.5+\alpha$) and $\Delta x$ is in millimeters.

| $\theta$ | $\Delta x$(mm.) | A | $\alpha$ | $\Delta\alpha$ |
|---|---|---|---|---|
| 0 | 0.0 | 2.942 | −5.25 | 0.00 |
| 6 | 16.6 | 2.827 | 2.90 | 1.92 |
| 12 | 34.0 | 2.703 | 11.00 | 3.77 |
| 18 | 52.3 | 2.575 | 19.05 | 5.57 |
| 24 | 71.0 | 2.442 | 26.40 | 6.65 |
| 30 | 90.2 | 2.308 | 33.00 | 6.98 |
| 36 | 109.5 | 2.172 | 38.85 | 6.56 |
| 42 | 128.7 | 2.037 | 43.65 | 5.09 |
| 48 | 147.6 | 1.903 | 47.75 | 2.92 |
| 54 | 166.1 | 1.773 | 51.30 | 0.21 |
| 60 | 183.8 | 1.648 | 54.31 | −3.03 |
| 66 | 200.6 | 1.530 | 56.70 | −6.88 |

The control for moving and translating the grating 14 is shown in FIGS. 3–6. As best seen in FIG. 5, the grating 14 is held in a C-shaped support bracket 70 by adjustable lower support 72, rear adjustment 74 and front adjustment 76 so that the ruled front face 78 of the grating is securely positioned substantially coincident with axis 54 as defined by bearing assemblies 80, 82 mounted on support arms 84, 86. Those support arms are in turn mounted for rotation about axis 56 as defined by support and thrust bearing 88 mounted on block 90 secured to the bottom of the tank structure 20 and bearing 92 secured to cover 94 of access port 96 in the upper wall of tank 20. The two support arms 84, 86 are rigidly secured together by web 98 to form a second C-shaped support bracket. Secured to the upper surface thereof is upstanding shaft 100 which extends through cover 94 and vernier unit 102 and is connected to sine bar 104 of the wavelength drive by conventional securing means shown as bolt 106.

The wavelength drive is best illustrated in FIG. 3. This wavelength drive provides a motion that is proportional to the sine of the angle of incidence of the grating and can be operated manually or by a twelve speed reversible electric drive 110. The wavelength drive moves the grating through the angle $\theta$ (FIG. 2) through linear motion of contact flat 112 (disposed at an adjustable angle) in cooperation with the follower 114 of arm 104. The length of arm 104 is also adjustable (slot 116 and screw 118) and through adjustment of the flat angle and bar length the drive may be made a direct function of wavelength. Flat 112 is mounted on ways 120 and is driven by screw 122 through gears 124, 126, 128, and 130 by motor 110. Spring 132 biases arm 104 against flat 112.

Shaft 100 is hollow (FIG. 5) and concentrically positioned within it is an independently rotatable shaft 140 supported at its upper end by bearing 142 and at its lower end by bearing 144. Adjustable drive for shaft 140 is provided by a suitable precision drive mechanism diagrammatically indicated at 146. Rotation of shaft 140 is coupled through gear elements 148, 150, and 152 to sector 154 (FIG. 7) which is clamped to stub shaft 156 on bracket 70 by clamping block 158 to rotate the grating 14 about pivot axis 54.

The mounting structure for mirror 12 is illustrated in FIGS. 7–9, the mounting for mirror 16 being similar except that that mirror is a larger (24 inch) mirror, and hence, the bearing structures and the drive structures are more massive. The mirror 12 is secured in a holder 160 by clamp plates 161. A mask 162, secured over the reflective surface of the mirror by plates 163, defines the mirror aperture. Recesses 164 in the holder structure receive stub shafts 166, 168 which are also received in bearing assemblies 170, 172, respectively. These bearing assemblies are secured on way structures 174, 176 which are welded to the tank 20. The entire mirror and bearing assembly thus may be slid into the tank through the opening closed by access door 30 and fixed in position for rotation about vertical axis 50 by clamping plates 178 and bolts 180.

The mirror holder structure 160 has a tab or ear portion 182 which extends outwardly from the side of the holder in a horizontal direction. Secured to the tank wall adjacent tab 182 is a way structure 184 which receives a control plate 186 that carries support 188 (FIG. 8) for tube 190, guide support 192, and a support assembly 194 for a screw drive. Tube 190 receives a follower 196 which is biased by spring 198 toward tab 182. Opposed to follower element 196 is a cap nut 200 threadedly received on shaft 202. Nut 200 is supported for axial movement by support 192 and when shaft 202 is rotated, it moves axially and through engagement with tab 182 rotates mirror 12 about vertical axis 50.

Rotation of threaded shaft 200 is produced by gear 204 which is secured on shaft 200 and meshes with gear 206 which in turn in rotated by universal coupling 208 and shaft 210. Shaft 210 extends through a vacuum seal in cover 212 over port 214 in the vacuum tank 20 to an actuating mechanism in the form of a hand wheel 216 connected to shaft 210 through gear elements 218, 220. The shaft 222 on which hand wheel 216 is mounted is connected to a suitable counter 224 to provide a precise indication of the angular position of mirror 12.

In the operation of the instrument, the grating may be rotated through the zero angle (the normal 58 of the grating being coincident with the optical axis of the instrument) over a range of approximately 70°. Coordinated adjustments of the optical elements about the axes 50, 52, 54, and 56 are made as indicated in the table set forth above so that the minimum coma remains centered at the exit aperture.

Figure 10:
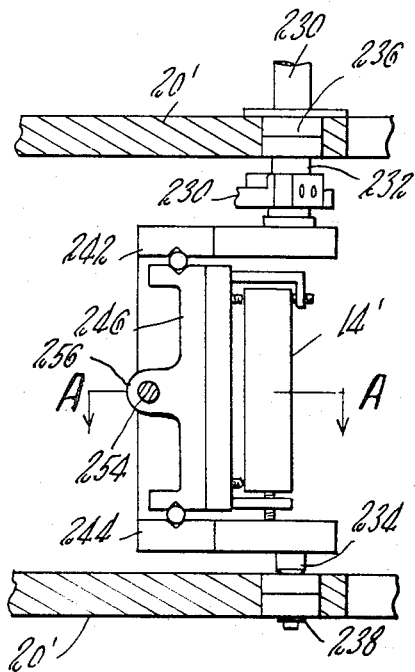
FIG. 10 is a diagrammatic view of a second type of diffraction grating mounting for use in a spectroanalytical instrument of the type shown in FIG. 1.
Figure 10A:
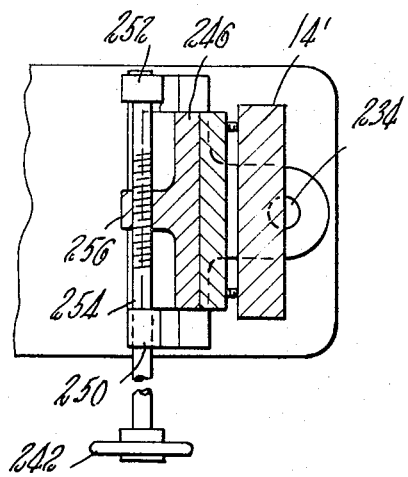
FIG. 10A is a sectional view of the grating mounting shown in FIG. 10 taken along line A—A of FIG. 10.

Other structures for moving optical components may also be employed. For example, as shown in FIGS. 10 and 10–A, a holder for grating 14' is mounted for rotation about a pivot axis 230 located in the front face of grating 14. Pivot axis 230 is defined by stub shafts 232, 234 which are mounted in bearing assemblies 236, 238, respectively. Suitable mechanical connection 240 coupled to shaft 232 controls rotation of the grating about axis 230. The grating holder structure also includes way 242, 244 in which the grating support 246 is mounted. The ways 242, 244 extend perpendicularly to the grating rulings and enable the grating to be translated in a direction perpendicular to axis 230. A threaded adjustment shaft 250 is rotatably secured to ears 252, 254 on the main support structure and receives internally threaded ear 256 on the grating support 246. Rotation of shaft 250 is accomplished by suitable manual or power driven means, diagrammatically indicated by handle 258 to translate the grating 14' as a function of the angular orientation of grating 14' about axis 230. Thus, this structure enables the combined rotational and translational movement of the grating for positioning in substantially the same position by the grating support mechanism employed in the above-described five meter instrument.

Figure 11:
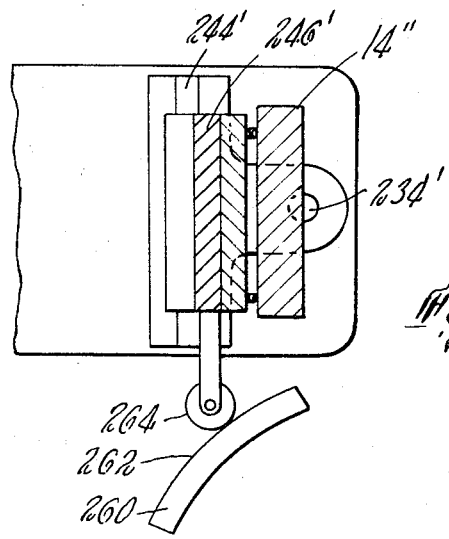
FIG. 11 is a diagrammatic view of still another type of grating mounting suitable for use in a instrument of the type shown in FIG. 1.

Still another arrangement is shown in FIG. 11 in which, rather than using a threaded translation actuating mechanism 250, 256, a cam 260 is provided which, as a function of the rotation of the grating 14'' about the axis 230', causes a translation of the grating support bracket 246' along the ways 244'. Cam surface 262 is engaged by cam follower 248 carried by support 246' and produces translation of the grating 14'' as a function of angular orientation to maintain the minimum coma position located at the center of the exit aperture.

Another form of instrument is diagrammatically indicated in FIG. 12 in which the off-axis angles are adjusted by translating the entrance and/or exit aperture structures 280, 282. Such aperture translation may be enabled by providing a series of bolt holes along the tank structure to provide a series of locations for the aperture structures. In such instruments the grating 284 may be mounted for pure rotation about axis 286 and the mirrors 288, 290 may be mounted for rotation as in the five meter embodiment, or may be oversize, as in the embodiment shown in FIGS. 13–21.

Figure 13:
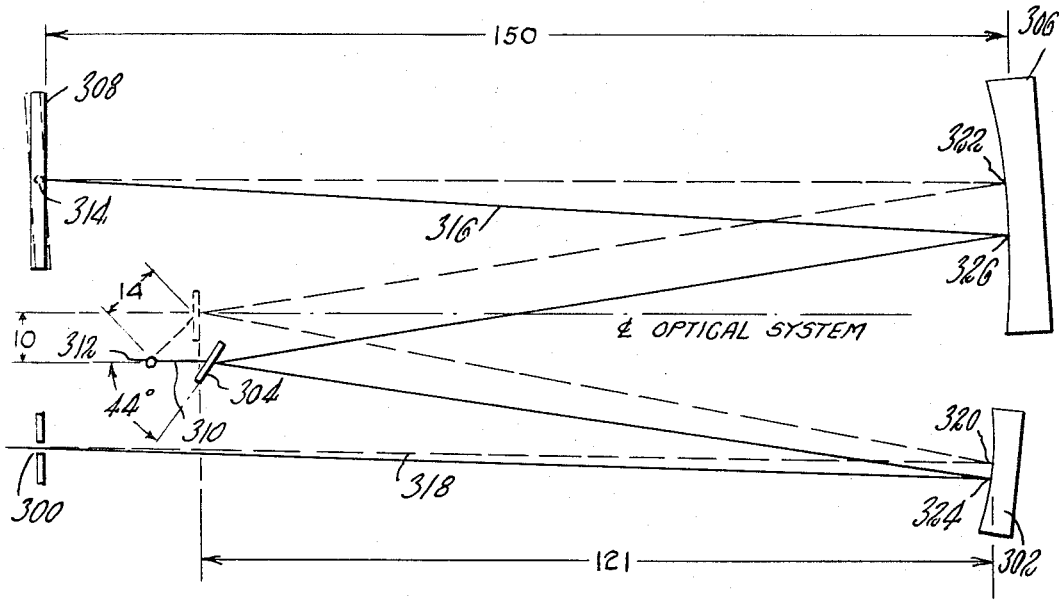
FIG. 13 is an optical diagram of still another embodiment of a spectroanalytical instrument constructed in accordance with the invention.

Still another form of instrument constructed in accordance with the invention is shown in diagrammatic form in FIG. 13. This instrument has an entrance aperture 300 with appropriate shutter and source equipment associated therewith, a spherical collimating mirror 302, a plane diffraction grating 304, a spherical camera mirror 306 of 1.5 meter focal length and a plate holder 308 mounted at the exit aperture of the instrument. The vacuum tank enclosing the optical components is not indicated in this diagram. The optical arrangement of the components preferably complies with the above-mentioned $\cos^3$ relation. In this embodiment the only translatable component is again the diffraction grating 304 which is fixedly mounted on arm 310 for rotation about offset pivot 312. The length of arm 312 is fourteen centimeters and the grating is set at an angle of 44° to that arm. Through selection of this angle and radius acceptable resolution (in the order of 0.05 A.) at aperture ratios of $f/12$ or smaller is obtained over a 40° range of angular orientation of grating 305 with respect to the optical axis of the instrument.

Both mirrors 302 and 306 are fixed in position, but the plate holder 308 is mounted for rotation about axis 314 so that its orientation with respect to the beam 316 of radiant energy reflected from mirror 306 may be made perpendicular. This instrument has an exit aperture of $f/12$ but as the mirrors are fixed and the grating translates, the effective apertures of the two mirrors for illumination purposes must be larger, the collimating mirror 302 having an effective aperture of $f/10$. Further, the entrance slit aperture is $f/8$, it being a circular aperture while the grating and mirror apertures are rectangular.

In operation, when the grating 304 is in the 0° position, the central ray 318 of energy passing through slit 300 is reflected from the left portion of mirror 302 (point 320) to impinge on the center of the diffraction grating 304 and is diffracted therefrom for impingement on the left portion of camera mirror 306 (part 322) and reflection therefrom to the center of the plate holder 308.

In the second grating position shown in FIG. 13 (40° position), the central ray is effectively shifted to the right portion of mirror 302 (point 324) and is reflected to impinge on the center of diffraction grating 304 in the 40° position. The diffracted central ray likewise impinges on the right portion of mirror 306 (point 326) and is reflected therefrom onto the center of plate holder 308. Due to the shifted location of the source of the reflected ray from mirror 308, the orientation of plate holder 308 is changed by rotation about axis 314 to directly face that point.

Taking into account the lower aperture ratio of this instrument, its resolution is comparable to the resolution of the instrument shown in FIGS. 1–9 over an angular orientation range of grating positions of 0°–40°. This instrument is less expensive to construct, as the grating mounting is simpler, only a single pivot being employed, and includes no provision for adjusting the angular orientation of either mirror. However, a set of movable baffles are incorporated in the instrument to define the beam of radiant energy that impinges on each optical component. The movable baffle structure and positions thereof are indicated in FIGS. 14 and 15.

Figure 14:
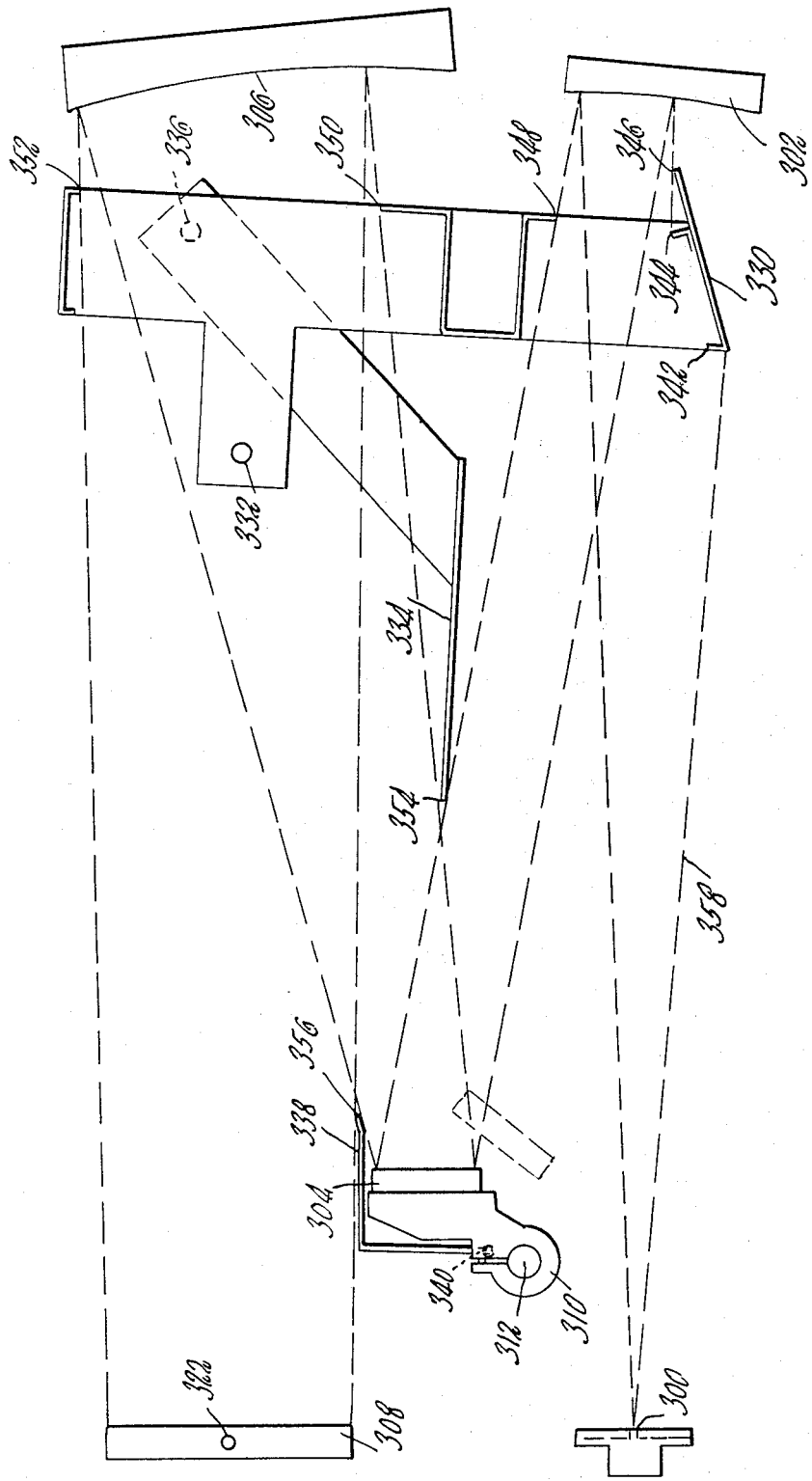

With reference to FIG. 14 these movable baffles include a first unit 330 mounted for rotation about pivot 332 fixed on the instrument tank; a second unit 334 mounted for roation about pivot 336 fixed on baffle unit 330; and a third baffle unit 338 mounted for rotation about pivot 340 on the grating support structure 310. Baffle unit 330 includes reinforcement 342; baffle edges 344 and 346 which define the variable edge of the beam 358 of radiant energy entering through slit 300; baffle edge 348 which defines an edge of the beam reflected from mirror 302; baffle edge 350 which defines an edge of the diffracted beam from grating 304; and edge 352 which defines one limit of the beam reflected from mirror 306. Baffle unit 334 includes a baffle edge 354 which in a first position (0°) defines a limit of the beam reflected from mirror 302 and in a second position (40°), a limit of the beam diffracted by grating 304. The third baffle unit 338 has an edge that defines a limit of the beam reflected by mirror 306. These interrelated baffles restrict the paths of radiant energy so that unwanted scattered or stray energy, e.g., from the oversize mirrors, does not adversely affect the recording instrumentation at the exit aperture.

In the 0° position (FIG. 14) baffle edges 344 and 346 define the beam edge; while in other positions toward the 40° position (FIG. 15) baffle edge 344 defines the beam edge. The other baffle edges modify the same portion of the beam transmitted through the instrument, with the exception of baffle edge 354 which functions only in the limiting positions of the grating in this design.

Further details of the interrelated mechanism for moving the baffles will be seen with reference to FIGS. 16–21 showing details of the instrument structure. That structure includes a sheet metal casing 360 inside of which is a vacuum chamber 362. The vacuum chamber has an access door 364 adjacent the grating mounting support plate 366 at the side of the chamber and the camera chamber has an access door 367 at the front end of the instrument. In addition, the rear wall 368 of the vacuum chamber is removable for access to the mounting of mirrors 302 and 306. Controls mounted on the instrument include positioning drive handle 370 and indicator 372 (FIG. 21) for for the angular orientation of the grating 304, grating limit indicator 374, power control switch 376 and indicator lamp 378, and shutter control pushbutton 380. Camera racking control includes handle 384 and indicator 386.

Handle 370 is coupled to shaft 390 and through gear 392 and quadrant 394 rotates shaft 396 which defines the pivot axis 312 about which the grating 304 is moved. A link 400 pinned to quadrant 394 moves adjustable length lever arm 402 which is secured to disc 404 mounted on baffle pivot axis 332. A second lever 406, coupled for rotation with disc 404, is pinned to link 408 and its movement rotates baffle unit 334 about axis 336. Thus rotation of handle 370 rotates grating 304 about an offset axis and further moves the baffle system as a direct function of the angular orientation of the grating. The camera plate orientation is similarly controlled by drive handle 382 and enables the orientation of the plate holder to be correlated with the orientation of grating 304.

The mounting structure for grating 304 is shown in greater detail in FIGS. 18–20. The structure includes rigid arm 310 secured on shaft 306 by split clamp 410 and bolt 412. Projecting forward from arm 310 is support bracket 414 which carries grating position adjust devices and opposed biasing devices diagrammatically indicated at 416 and 418, respectively. An aperture defining mask 420 is secured in front of the grating.

Pivotally mounted on the support structure is arm 422 which supports baffle unit 338. A link 424 is pinned at one end to a point intermediate the ends of arm 422 and is secured at its other end to plate 366 by pin 426. Thus, as the grating 304 is rotated about axis 312 away from the 0° position (shaft 396), the baffle unit 338 is rocked and moves baffle edge to follow the shifting of the beam of radiant energy that is to be passed through the exit aperture.

The translation of optical components, as described above, reduces the coma due to use of a spherical reflector at an off-axis angle and preferably the components are arranged so that the minimum coma value is maintained at the center of the exit aperture. While several different organizations of optical components have been shown and described, still other combinations of component organization may obviously be devised in accord with the teachings herein. For example, monochrometers of the Ebert type employing a single large mirror may incorporate an arrangement where the grating is translated or the spacing between the entrance and exit apertures is varied as a function of grating orientation, or both.

Also, it will be obvious that a variety of types of components may be employed, for example, the exit aperture may be a slit or an extended plane suitable for receiving a plate holder. Therefore, while several embodiments of the invention have been shown and described, it is not intended that the invention be limited thereto or to details thereof and departures may be made therefrom within the spirit and scope of the invention as defined in the claims.

What is claimed is:

1. A spectroanalytical system comprising a first optical component defining an entrance aperture,
a second optical component defining a focal plane, said entrance aperture being positioned adjacent the focal plane of said second optical component, said second optical component being disposed to receive divergent rays of radiant energy passed through said entrance aperture and to render said divergent rays substantially parallel,
a third optical component defining a plane diffraction grating surface,
said second optical component being arranged to direct said substantially parallel rays of radiant energy for incidence upon said diffraction grating surface at an angle $\alpha$ to a normal passing through the face of said diffraction grating,
a fourth optical component defining a focal plane and being arranged to receive rays of said radiant energy diffracted from said grating at an angle $\beta$ to the normal passing through the face of said grating and focus them to form a spectral image of the source of said rays of radiant energy in the focal plane of said fourth optical component,
a fifth optical component defining an exit aperture disposed adjacent said focal plane of said fourth optical component,
means to rotate said diffraction grating about an axis to change the angular orientation of the face of said diffraction grating with respect to said second and fourth optical components, and means to translate at least said diffraction grating as a function of the change in angular orientation of the face of said diffraction grating such that said grating axis has a component of motion perpendicular to said substantially parallel rays of radiant energy to stabilize a coma aberration at said exit aperture over a range of angular positions of the face of said diffraction grating with respect to said second and fourth optical components.

2. In a spectroanalytical instrument having an optical axis, a first spherical reflecting surface area disposed at a first off-axis angle to reflect a beam of radiant energy and form a substantially collimated beam of radiant energy, a plane grating mounted for rotation about an axis in the plane of the front face of said grating and perpendicular to said optical axis and disposed to form a diffracted beam of radiant energy from said collimated beam, and a second spherical reflecting surface area disposed at a second off-axis angle to reflect said diffracted beam of radiant energy, and
coma reduction means comprising means to translate said plane grating in the plane of the instrument such that said grating axis has a component of motion in a direction perpendicular to said optical axis to vary the ratio of said first and second off-axis angles as a function of the angular orientation of said plane grating with respect to the optical axis of said instrument.

3. The instrument as claimed in claim 2 wherein said coma reduction means includes means responsive to a cam surface to translate said grating in the plane of the instrument and in a direction perpendicular to said optical axis.

4. The instrument as claimed in claim 2 wherein said grating translation means includes a grating support mounted for rotation about an axis offset from the face of the grating a distance substantially greater than the thickness of the grating and further including means to rotate said grating about an axis substantially coincident with the face of said grating.

5. The instrument as claimed in claim 2 and further including means to rotate one of said surface areas about an axis perpendicular to the plane of the instrument.

6. The instrument as claimed in claim 2 and further including baffle means disposed between said surface areas and said grating, and means to move said baffle means as a function of the angular orientation of said grating.

7. The instrument as claimed in claim 2 wherein the aperture ratio of said first surface area is smaller than the aperture ratio of said second surface area.

8. A spectroanalytical system including first and second spherically concave mirrors, a plane diffraction grating, and entrance and exit apertures,
said system defining a path for radiant energy from said entrance aperture to said exit aperture via said first mirror, said diffraction and said second mirror in sequence,
means to change the angular orientation of the face of said diffraction grating,
a baffle system separating adjacent portions of said path of radiant energy from said entrance aperture to said exit aperture,
means to move a component of said system to change the direction of said path of radiant energy as a function of the change in angular orientation of said diffraction grating, and
means to move said baffle system as a function of the change in angular orientation of said diffraction grating so that said baffle system continues to separate adjacent portions of said path in said changed direction.

9. A spectroanalytical instrument comprising structure defining an entrance aperture,
structure defining an exit aperture,
a first optical structure including a first spherical reflecting surface disposed to receive divergent rays of radiant energy passing through said entrance aperture,
said entrance aperture being positioned adjacent the focal plane of said first reflecting surface,
a second optical structure including a plane diffraction grating surface for producing a diffracted beam of radiant energy,
said first reflecting surface being arranged at an off-axis angle A to render said divergent rays of radiant energy parallel for incidence upon said diffraction grating surface at an incidence angle $\alpha$ to a normal passing through the face of said diffraction grating except for coma aberrations introduced by said first reflecting surface,
a third optical structure including a second spherical reflecting surface arranged in off-axis angle B to receive the beam of radiant energy diffracted from said grating at a diffraction angle $\beta$ and to reflect and focus said beam of radiant energy to form a spectral image adjacent the focal plane of said second reflecting surface adjacent said exit aperture,
said first reflecting surface and entrance aperture being located on the same side of a first line passing through the center point of said diffraction grating and bisecting a second line passing between the center points of said first and second reflecting surfaces, with said second reflecting surface and its focal plane being positioned on the opposite side of said line from said first reflecting surface,
means to rotate said diffraction grating about a first axis to vary the relationship between said incidence angle $\alpha$ and said diffraction angle $\beta$, and
means to translate at least said diffraction grating laterally such that said first axis has a component of motion perpendicular to said first line to maintain the ratio of A to B proportional to the ratio of $\cos^3 \beta$ to $\cos^3 \alpha$ through a range of angular orientations of said diffraction grating.

10. The instrument as claimed in claim 9 wherein said grating translation means includes a grating support mounted for rotation about an axis offset from the grating surface a distance substantially greater than the thickness of the grating, and further including means to rotate both of said reflecting surfaces about axes perpendicular to the plane of the instrument.

11. The instrument as claimed in claim 10 and further including baffle means disposed between said reflecting surfaces and said grating, and means to move said baffle means as a function of the angular orientation of said grating surface.

12. The instrument as claimed in claim 11 wherein the aperture ratio of said first reflecting surface is smaller than the aperture ratio of said second reflecting surface.

13. A spectroanalytical instrument comprising a plane diffraction grating having a series of parallel rulings, a first off-axis spherical mirror arranged to direct substantially parallel rays to said plane grating, a second off-axis spherical mirror arranged to collect a range of diffracted radiation from said plane grating and focus said diffracted radiation on to a focal plane, the center points of said mirrors, said plane grating and said focal plane lying in the same optical plane, and the angular relationship of said off-axis mirrors and said plane grating being such that coma at the center of said focal plane is minimized, means for rotating said plane grating about an axis parallel to said grating rulings, and means for translating said axis of said plane grating laterally in a direction parallel to said optical plane as a function of the change in angular orientation of the face of said diffraction grating to maintain substantially minimum coma at the center of said focal plane for a range of grating angles.

14. The instrument as claimed in claim 13 wherein said grating translation means includes a grating support mounted for rotation about an axis offset from the face of the grating a distance substantially greater than the thickness of the grating, and further including baffle means disposed between said mirrors and said grating, said baffle means including a first baffle unit mounted for rotation about an axis parallel to said grating support axis and a second baffle unit mounted for rotation on said first baffle unit, and means to move said baffle means as a function of the angular orientation of said grating.

15. The instrument as claimed in claim 13 wherein said grating translation means includes a support for said plane grating, means to rotate said grating support about a first axis located in the front face of said plane grating and parallel to said grating rulings, and means to rotate said grating support about a second axis parallel to said first axis but displaced therefrom, and further including an evacuable chamber enclosing said mirrors and said grating, and control means extending through the wall of said chamber for controlling the rotation of said grating about said first and second axes, said control means includes two drive shafts coaxial with one other and located coincident with one of said axes.

16. The instrument as claimed in claim 15 and further including a mirror support for each of said mirrors, each said mirror support including first and second bearings defining an axis parallel to said grating rulings, means for rotating each said mirror support about its support axis, and means providing a precise indication of the angular orientation of said mirror supports.

References Cited

UNITED STATES PATENTS

| | | | |
|---|---|---|---|
| 2,750,836 | 6/1956 | Fastie | 88—145 |
| 2,874,608 | 2/1959 | Beloian | 88—145 |
| 3,011,391 | 12/1961 | Fastie | 88—145 |
| 3,216,315 | 11/1965 | Keller | 88—145 |
| 3,291,982 | 12/1966 | Alexander et al. | 88—145 |

JEWELL H. PEDERSEN, *Primary Examiner.*

B. J. LACOMIS, *Assistant Examiner.*